Patented Mar. 8, 1932

1,848,664

UNITED STATES PATENT OFFICE

KARL ROHDE, OF FINOW, NEAR BERLIN, GERMANY, ASSIGNOR TO THE FIRM SCHERING-KAHLBAUM A. G., OF BERLIN, GERMANY

PRODUCTION OF FORMIC ACID

No Drawing. Application filed March 21, 1929, Serial No. 349,003, and in Germany March 27, 1928.

My invention refers to the production of formic acid and more especially to means whereby anhydrous formic acid can be obtained from the dilute acid.

By treating formic acid, which contains water, with acetic acid anhydride a mixture of concentrated acetic acid and formic acid can be obtained, however, it is impossible to isolate from this mixture the concentrated formic acid on a commercial scale. Apart therefrom the necessary regeneration of the acetic acid anhydride is connected with great cost.

I have now ascertained that anhydrous formic acid can be obtained in a very simple manner, if formic acid containing water is treated with acid anhydrides which form readily from their acids, for instance by mere heating, and separating the anhydrous formic acid from the acids used for dehydrating the formic acid by distillation, preferably in vacuo.

This reaction is rather surprising inasmuch as one would not have expected that anhydrides such as for instance phthalic acid anhydride or the different dehydration products of orthoboric acid and orthophosphoric acid would be able to separate water from a compound of the hydroscopic properties of formic acid of 95%. It is also astonishing that the other acids, which form, are not reconverted into their anhydrides when the formic acid is distilled off.

In practising my invention I prefer to proceed as follows:

Example 1

100 parts by weight of a formic acid of 95% are heated with 45 parts of phthalic acid anhydride to 90° C. during 1 to 2 hours. From the resulting solution of phthalic acid and formic acid a formic acid of 99–100% is obtained with the substantially calculated yield by distillation in vacuo or at ordinary pressure. The phthalic acid can be re-converted into the anhydride in a well known manner.

Example 2

100 parts by weight of formic acid of 95% are heated with 9 parts of pyroboric acid during ½ hour to about 100° C. On distilling in vacuo the resulting solution of orthoboric acid in anhydrous formic acid, an excellent yield of formic acid of 99–100% is obtained, while the orthoboric acid can be readily re-converted into pyroboric acid in a well known manner.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing anhydrous formic acid comprising treating formic acid containing water with a little more than the quantity, equivalent to the water contents, of an acid anhydride, which is readily formed from its acid by heating, and isolating the formic acid by distillation.

2. The method of producing anhydrous formic acid comprising treating formic acid containing water with a little more than the quantity, equivalent to the water contents, of an acid anhydride, which is readily formed from its acid by heating, and isolating the formic acid by distillation in vacuo.

3. The method of producing anhydrous formic acid comprising treating at an elevated temperature formic acid containing water with a little more than the quantity, equivalent to the water contents, of an acid anhydride, which is readily formed from its acid by heating and isolating the formic acid by distillation.

4. The method of producing anhydrous formic acid comprising heating formic acid containing water with a little more than the quantity, equivalent to the water contents, of pyroboric acid, and isolating the formic acid by distillation.

5. The method of producing anhydrous formic acid comprising heating formic acid containing water with a little more than the quantity, equivalent to the water contents, of phthalic acid anhydride, and isolating the formic acid by distillation.

In testimony whereof I affix my signature.

KARL ROHDE.